US008046128B2

(12) United States Patent
Bauerle et al.

(10) Patent No.: US 8,046,128 B2
(45) Date of Patent: Oct. 25, 2011

(54) METHOD FOR OPERATING AN ENGINE CONTROL MODULE UNDER LOW VOLTAGE CONDITIONS

(75) Inventors: Paul A. Bauerle, Fenton, MI (US); Sharon L. Storch, Brighton, MI (US); Joseph M. Stempnik, Warren, MI (US); Richard B. Jess, Haslett, MI (US); James L. Worthing, Munith, MI (US); Daniel G. Bolstrum, West Bloomfield, MI (US)

(73) Assignee: GM Global Technology Operations LLC

( * ) Notice: Subject to any disclaimer, the term of this patent is extended or adjusted under 35 U.S.C. 154(b) by 1259 days.

(21) Appl. No.: 11/685,848

(22) Filed: Mar. 14, 2007

(65) Prior Publication Data

US 2008/0228337 A1 Sep. 18, 2008

(51) Int. Cl.
*G01M 15/00* (2006.01)

(52) U.S. Cl. ............ 701/34; 701/29; 701/103; 701/107; 702/57; 702/63; 702/64; 123/478; 123/479; 324/380

(58) Field of Classification Search .................... 701/29, 701/34, 103, 107; 123/406.13, 478, 479; 340/438; 327/77; 702/57, 63, 64; 324/380
See application file for complete search history.

(56) References Cited

U.S. PATENT DOCUMENTS

| | | | | |
|---|---|---|---|---|
| 5,243,324 | A * | 9/1993 | Bober | 340/439 |
| 5,265,022 | A * | 11/1993 | Chonan et al. | 701/102 |
| 5,307,776 | A | 5/1994 | Unuvar et al. | |
| 6,167,343 | A | 12/2000 | Bauerle | |
| 6,513,492 | B1 | 2/2003 | Bauerle et al. | |
| 6,698,398 | B2 | 3/2004 | Bauerle | |
| 6,957,140 | B1 | 10/2005 | Bauerle et al. | |

OTHER PUBLICATIONS

U.S. Appl. No. 60/763,483, filed Jan. 30, 2006.

* cited by examiner

*Primary Examiner* — Thomas Black
*Assistant Examiner* — Peter D Nolan

(57) ABSTRACT

A fault clearing system and method for an engine control system includes a plurality of processor modules to control and monitor the engine and set a plurality of faults. The plurality of processor modules includes an electronic throttle control (ETC) module to control and monitor a throttle of the engine, and a plurality of engine sensors and ETC sensors. An ETC diagnostic module monitors the ETC sensors and engine sensors, with the ETC diagnostic module setting a low voltage induced fault. The ETC diagnostic module will also enter one of a plurality of low voltage states in response to the low voltage induced fault. The ETC diagnostic module selectively controls the ETC module and selectively clears the faults in the ETC module and plurality of processor modules upon entry into one of the low voltage states.

10 Claims, 6 Drawing Sheets

METHOD FOR OPERATING AN ENGINE CONTROL MODULE UNDER LOW VOLTAGE CONDITIONS

FIELD

The present disclosure relates to engine control systems, and more particularly to electronic throttle control diagnostic fault clearing for transient or temporary low voltage conditions.

BACKGROUND

The statements in this section merely provide background information related to the present disclosure and may not constitute prior art.

Traditionally, automotive vehicles include multiple systems that regulate overall operation of the vehicle. For example, the vehicle includes a powerplant (e.g., an internal combustion engine) that generates drive torque, an energy storage device (e.g., battery pack) that provides electrical energy, a transmission that distributes the drive torque to drive wheels and various other systemsEach of these systems requires an associated control module or modules to achieve coordinated control and operation of the vehicle. These modules communicate with one another to regulate operation of the vehicle. Intra-processor communications utilize interfaces such as an Serial Peripheral Interface (SPI) or the universal asynchronous receiver/transmitter (UART), while inter-processor communications utilize a Controller Area Network (CAN) and/or Class2 Network.

Electronic throttle control (ETC) systems replace the mechanical accelerator pedal assemblies also used in vehiclesETC sensors take input from the driver and send it to an engine control system in real time. The engine control system modulates the air/fuel flow to the engineDirect control of the engine is shifted from the driver to the engine control system to improve efficiency. Under certain failure mode conditions, the ETC system will operate under an acceleration governing function. This limited-power mode will prevent damage to the engine. Once a vehicle has entered limited-power mode it needs to remain there until the fault has been determined and remedied.

Due to the increasing complexity of automotive systems and the need for subsystems such as ETC, there exists a large number of diagnostics that are required to detect failures in a very short time (<200 ms) between processors. However, a number of inter and intra-processor diagnostic fault codes may be falsely set when the voltage drops in the vehicle due to the interaction between various vehicle components operating at or beyond their specified voltage rangesLow voltage conditions may result in faults that could potentially indicate a need for costly repairs. For example, the low voltage induced faults may lead to the unnecessary replacement of components when the charging system fails and/or the vehicle battery is drained, thus causing higher warranty costs and customer dissatisfaction.

SUMMARY

Accordingly, the present disclosure provides a fault clearing system and method for an engine control system. The engine control system includes a plurality of processor modules to control and monitor the engine and set a plurality of faults. The plurality of processor modules includes an electronic throttle control (ETC) module to control and monitor a throttle of the engine, and a plurality of engine sensors and ETC sensors. An ETC diagnostic module monitors the ETC sensors and engine sensors, with the ETC diagnostic module setting a low voltage induced fault. The ETC diagnostic module will also enter one of a plurality of low voltage states in response to the low voltage induced fault. The ETC diagnostic module selectively controls the ETC module and selectively clear the faults in the ETC module and plurality of processor modules upon entry into one of the low voltage states.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
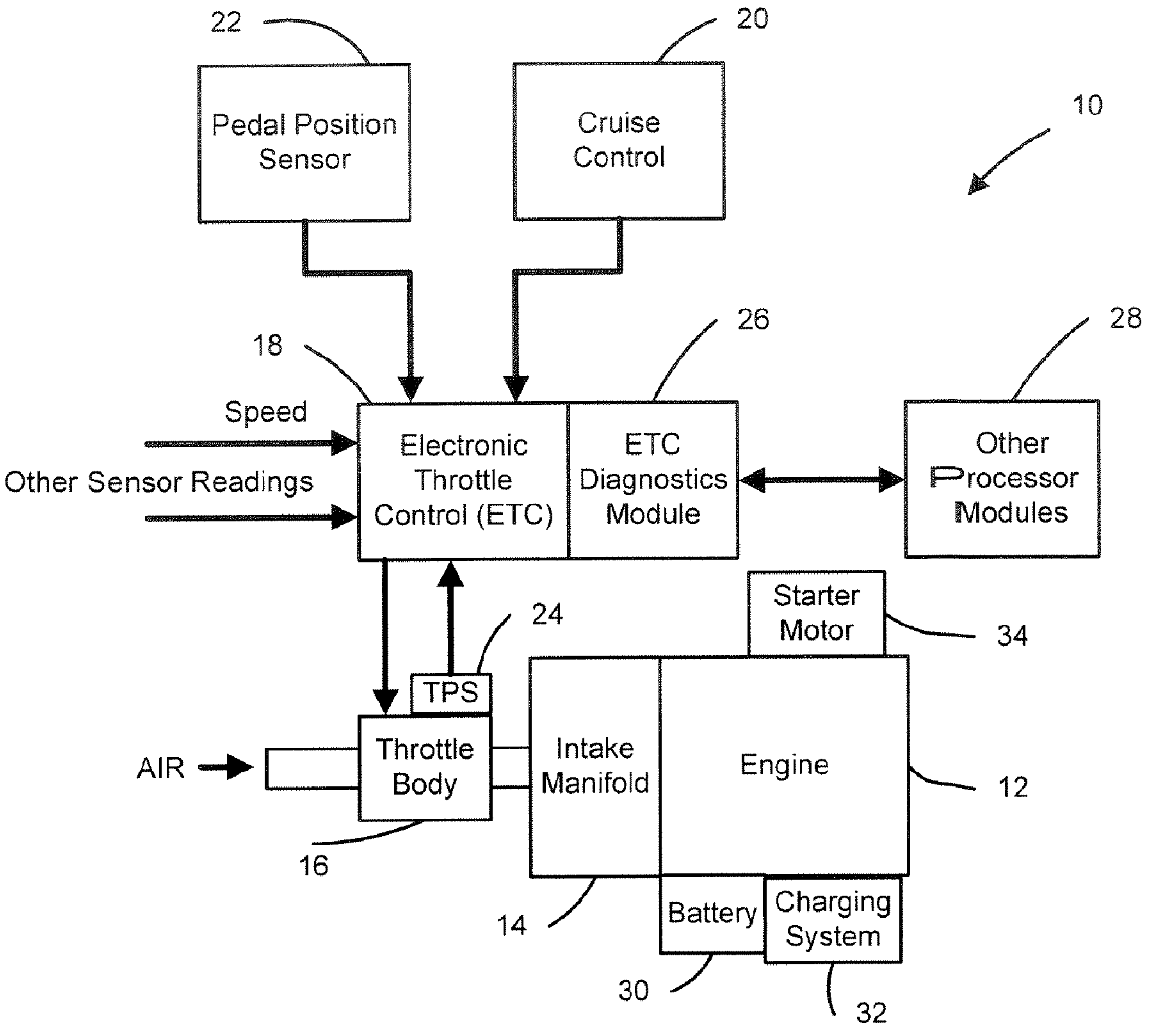
FIG. 1 is a schematic of a vehicle with an improved electronic throttle control system according to the present disclosure.

The following description of the preferred embodiment is merely exemplary in nature and is in no way intended to limit the present disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle is schematically illustrated. The vehicle 10 is driven by an engine 12 that combusts an air and fuel mixture to produce drive torque. Air is drawn into an intake manifold 14 through a throttle body 16. The throttle 16 allows air to flow into the intake manifold 14. The air within the intake manifold 14 is distributed to cylinders (not shown) and is mixed with fuel for combustion.

Overall operation of the engine is monitored and regulated by a control module, such as an ETC 18More specifically, the ETC 18 regulates the engine 12 based on driver inputs and engine operating conditions. The driver inputs include an accelerator pedal (not shown) and/or a cruise control module 20. An accelerator pedal position sensor 22 is responsive to a position of the accelerator pedal and generates a pedal position signal to the ETC 18. The accelerator pedal position is indicative of a desired engine torque output from the driver. The cruise control module 20 signals desired engine torque output based on a set point set by the driver. Engine operating conditions are provided to the ETC diagnostic module 26 and other processor modules 28 by sensors such as the throttle position sensor 24 and other engine sensors supplying signals indicative of engine performance, such as vehicle speed, etc. The electrical energy supplied to the vehicle 10 is provided by a battery 30 and it's charging system 32.

The ETC diagnostic module 26 provides a complex series of diagnostics that monitor the ETC's sensors and its control of engine power. The ETC diagnostic module 26 ensures proper operation of engine 12. For example, the ETC 18 will limit engine power when the diagnostics detect a condition that could potentially harm the engine 12. Engine control module subsystems connected through an API network, as well as other controllers or processor modules 28 connected through CAN networks, provide for the full range of vehicle management, control and diagnostics.

Due to the unpredictability of low voltage conditions, control modules, including the ETC 18 are affected by transient or temporary low voltage conditions. A low voltage condition is considered transient when it originates from starter motor 34 transients that cause the vehicle voltage to drop to very low values and then ramp up slowly as inertia decreases with increasing engine RPM. An example temporary low voltage condition would be a dead battery 30 or a failed charging system 32.

The ETC diagnostic module 26 initializes and resets all ETC diagnostics and fail counters, as well as other subsystems that may be affected by low voltage conditions. Controller initialization is executed at engine ignition and whenever the ETC 18 needs a "running reset." After the initialization, the ETC diagnostic module 26 executes an assortment of diagnostics, including a periodic low voltage fault clearing loop at an exemplary interval of 12.5 ms. The periodic loop that the ETC diagnostic module 26 performs within may be a synchronous processor controlled loop. This periodic interval allows continuous monitoring for vehicle low voltage conditions. The example 12.5 ms time interval allows the ETC diagnostic module 26 time to complete the full complement of diagnostic routines, commonly known as the main diagnostics for ETC 18 operation and fault detection, before the low voltage fault clearing loop starts again.

The fault clearing loop begins by incrementing a series of ETC diagnostic timer modules (not shown) as determined by a comparison between ETC sensors and engine sensor readings (not shown) and predefined calibration values. In a preferred embodiment, the calibration values are set at the factory while future calibration adjustments may be possible at service stations. The sensor readings supplied to the ETC 18 are also supplied to the ETC diagnostic module 26. With the ETC diagnostic timer modules incremented, the ETC diagnostic module 26 selects from a plurality of low voltage condition states, including: a low power state, a crank transition state, a low voltage non-cranking state, and a low voltage recovery state.

If the vehicle is already in a limited-power mode of operation, the low voltage fault clearing loop will be suspended without clearing any low voltage induced faults. A limited-power mode occurs when one or more ETC sensors, such as the throttle position sensor 24 or the accelerator position sensor 22 has a fault. Or if the throttle body 16 has a fault. This ensures that when the engine 12 is in a power-limited mode of operation, the ETC diagnostics will not reset a diagnostic signal nor take any remedial action which could result in increased engine power.

During starter motor 34 crank transitions, transient voltage drops need to be handled by clearing the low voltage related ETC diagnostics but allowing the starter motor 34 to continue to start the engine 12. This is accomplished by the ETC diagnostic module 26 determining whether vehicle 10 voltage has dropped below a calibrated lower voltage threshold, and whether the engine 12 is cranking, and if so, the ETC diagnostic module 26 setting a low voltage cranking signal to TRUE and ensuring fuel is enabled. If the fault clearing loop determines that the vehicle 10 voltage has dropped below a calibrated lower voltage threshold and the starter motor 34 is not cranking, the ETC diagnostic module's fault clearing loop will disable all diagnostics that use or monitor the low voltage active signal. In addition, the fuel will be disabled.

When the vehicle 10 has recovered from its low voltage condition, indicated when the measured vehicle 10 voltage rises above a calibrated upper voltage threshold, the fault clearing loop needs to return ETC diagnostics to normal. This will be accomplished once an ETC diagnostic timer module (not shown) has given processor related failures time to clear from the ETC 18, other ECM subsystems, and other processor modules 28. Throughout the three operating states of the fault clearing loop, selectable when the vehicle 10 is not in a limited-power mode, fault signals are cleared from the ETC 18, its subsystems and other processor modules 28 through the use of fault clearing modules (not shown) that apply "code clears" to the ETC diagnostic module 26 and other affected processors 28. In other words, if the vehicle 10 is not in a limited-power mode of operation, the crank transition state, low voltage non-cranking state or low voltage recovery states may be selected by the ETC diagnostic module 26, depending on the detected condition of the vehicle 10, to ensure that fault signals are cleared from the ETC 18, its subsystems and other processor modules 28 through the use of fault clearing modules that apply "code clears" to the ETC diagnostic module 26 and other affected processors 28.

Figure 2:
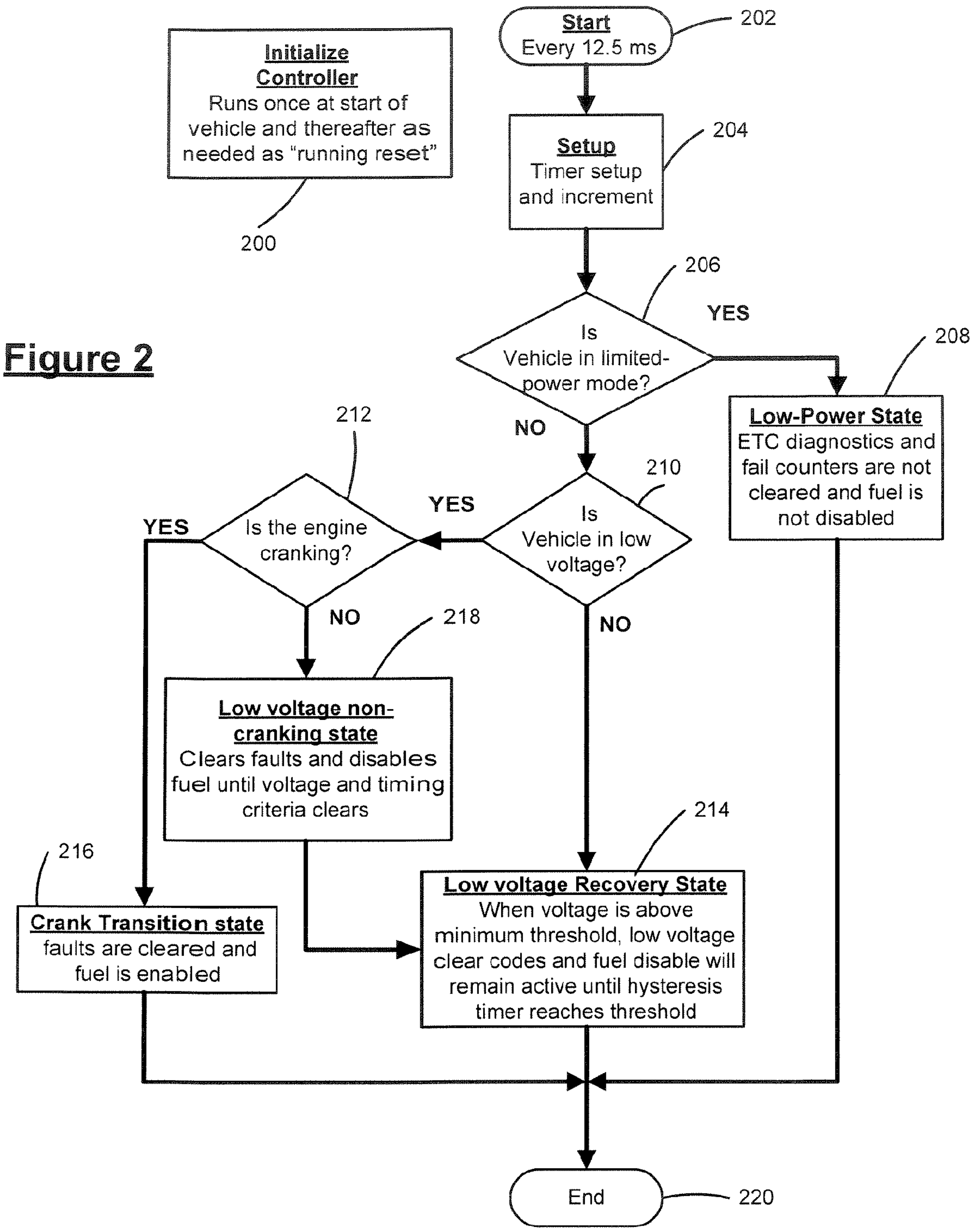
FIG. 2 is a flow chart illustrating the steps performed by the fault clearing loop of the present disclosure.

FIG. 2 illustrates the steps performed by the fault clearing loop of the present disclosure in a flow chart. In step 200, all controllers and diagnostic systems are reset at engine ignition and as needed as "running resets." Continuing in step 202, the fault clearing method is started after each periodic interval. An exemplary periodic interval is 12.5 ms. In step 204, a plurality of timers is incremented. In step 206, the fault clearing loop determines whether the ETC 18 is in a limited-power mode. If the ETC 18 is in a limited-power mode, the fault clearing loop is not allowed to run. If the fault clearing loop determines the engine 12 is in a limited-power mode, the loop continues with step 208. If the fault clearing loop determines the engine 12 is not in a limited-power mode, the loop continues with step 210. In step 208, the ETC diagnostic module's low power state is set by not continuing with the fault clearing loop, therefore, ETC diagnostics faults are not cleared and fuel is not disabled. In step 210, if the fault clearing loop determines that the vehicle is operating in a low voltage condition, the loop continues with step 212. If the fault clearing loop determines the vehicle is not operating in a low voltage condition, the loop continues with step 214. In step 212, if the starter motor 34 is cranking, the fault clearing loop will continue with step 216. If the starter motor 34 is NOT cranking, the fault clearing loop will continue with step 218.

In step 216, the crank transition state is set by clearing the ETC diagnostics faults and enabling fuel to start the engine 12During the crank transition state, starter motor 34 cranking results in a vehicle 10 voltage drop that ramps up slowly as inertia decreases with increasing engine RPM. This state will clear the ETC diagnostics but allow the starter motor 34 to start the engine 12. The crank transition state will generate a low voltage cranking signal that clears ETC diagnostics and a signal enabling the flow of fuel. After step 216 completes, the fault clearing loop continues in step 220 and ends.

In step 218, the low voltage non-cranking state is setDuring the low voltage non-cranking state, once vehicle voltage drops below a calibrated low voltage threshold and the starter motor 34 is not cranking, all diagnostics are disabled that use or monitor the low voltage active signal. Further, the fuel supply is disabled. After the fault clearing loop completes step 218, the loop continues in step 214.

In step 214, the low voltage recovery state is set. In step 214, if the fault clearing loop determines that vehicle voltages are no longer below a calibrated voltage threshold, the ETC diagnostic module 26 will return to normal after a preset period of time to provide a hysteresis interval. In dealing with low voltage transitions, the fault clearing loop can clear processor related failures once the processor recovers from the low voltage state. Because other processor modules 28 will also set faults when the ETC 18 fails to respond, a hysteresis loop allows enough time to clear failures but not jeopardize the security of the system. After the fault clearing loop completes step 214, the loop continues in step 220 and ends.

Figure 3:
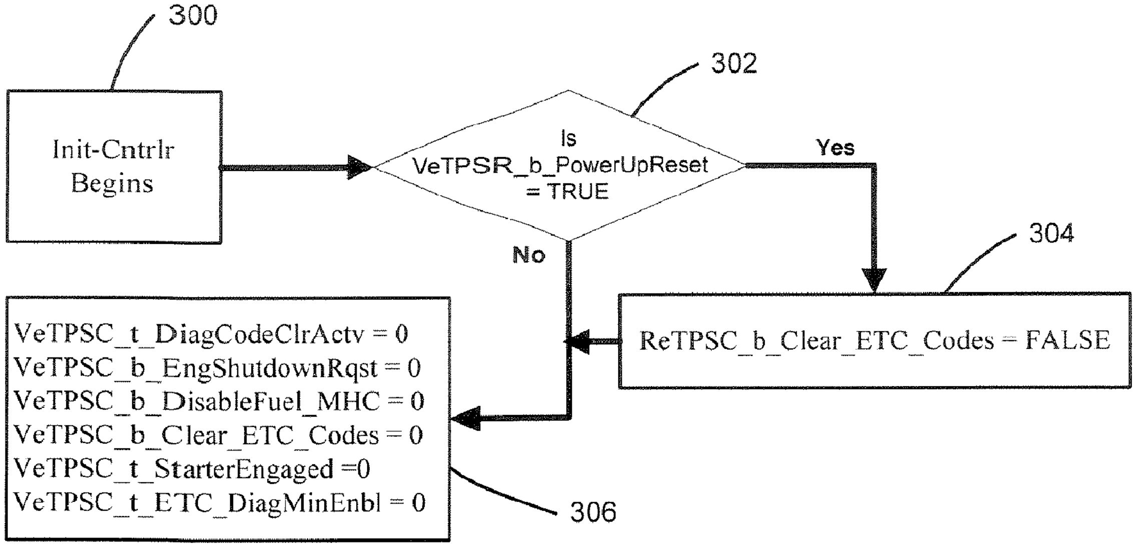
FIG. 3 is a flow chart illustrating the processor initialization steps performed by the fault clearing loop of the present disclosure.

FIG. 3 provides detailed steps for controller initialization with the use of a fault clearing algorithm. In a preferred embodiment, the fault clearing algorithm is a software routine periodically executed by the ETC diagnostic module 26. In step 300, controller initialization begins after vehicle engine ignition and during, as required with "running resets." In step 302, if VeTPSR_b_PowerUpReset equals TRUE, then control continues in step 304. If VeTPSR_b_PowerUpReset equals FALSE then control continues in step 306.

In step 304, control sets ReTPSC_b_Clear_ETC_Codes to FALSE. This signal when TRUE, indicates that the low voltage fault clearing and fuel disable logic is active. Once step 304 is completed, control continues in step 306.

In step 306, control sets the following signals and timers to 0: VeTPSC_t_DiagCodeClrActv, VeTPSC b_EngShutdown Rqst, VeTPSC_b_DisableFuel_MHC, VeTPSC_b_Clear_ETC_Codes, VeTPSC_t_StarterEngaged and VeTPSC_t_ETC_DiagMinEnbl. VeTPSC_t_DiagCodeClrActv is used to count up to a calibration threshold value and while less than calibration, code clears will be continuously (once every periodic value, here set to an exemplary 12.5 ms) applied to ETC rings (such as APSR, MCPR, TRSR and VLTR)VeTPSC_b_EngShutdownRqst is the low voltage fuel disable signal and is set to FALSE. VeTPSC_b_DisableFuel_MHC is the redundant fuel disable signal and is set to FALSE. The VeTPSC_b_Clear_ETC_Codes signal, also set to FALSE, enables the clearing of all the ETC diagnostics and fail counters. VeTPSC_t_StarterEngaged, reset to 0 seconds, is a timer that starts when the starter motor 34 is commanded onVeTPSC_t_ETC_DiagMinEnbl, also reset to 0, is a timer that sets the minimum time the ETC diagnostics are allowed to run before any low voltage ETC diagnostic module 26 faults are cleared. Once step 306 completes, controller initialization ends.

Figure 4A:
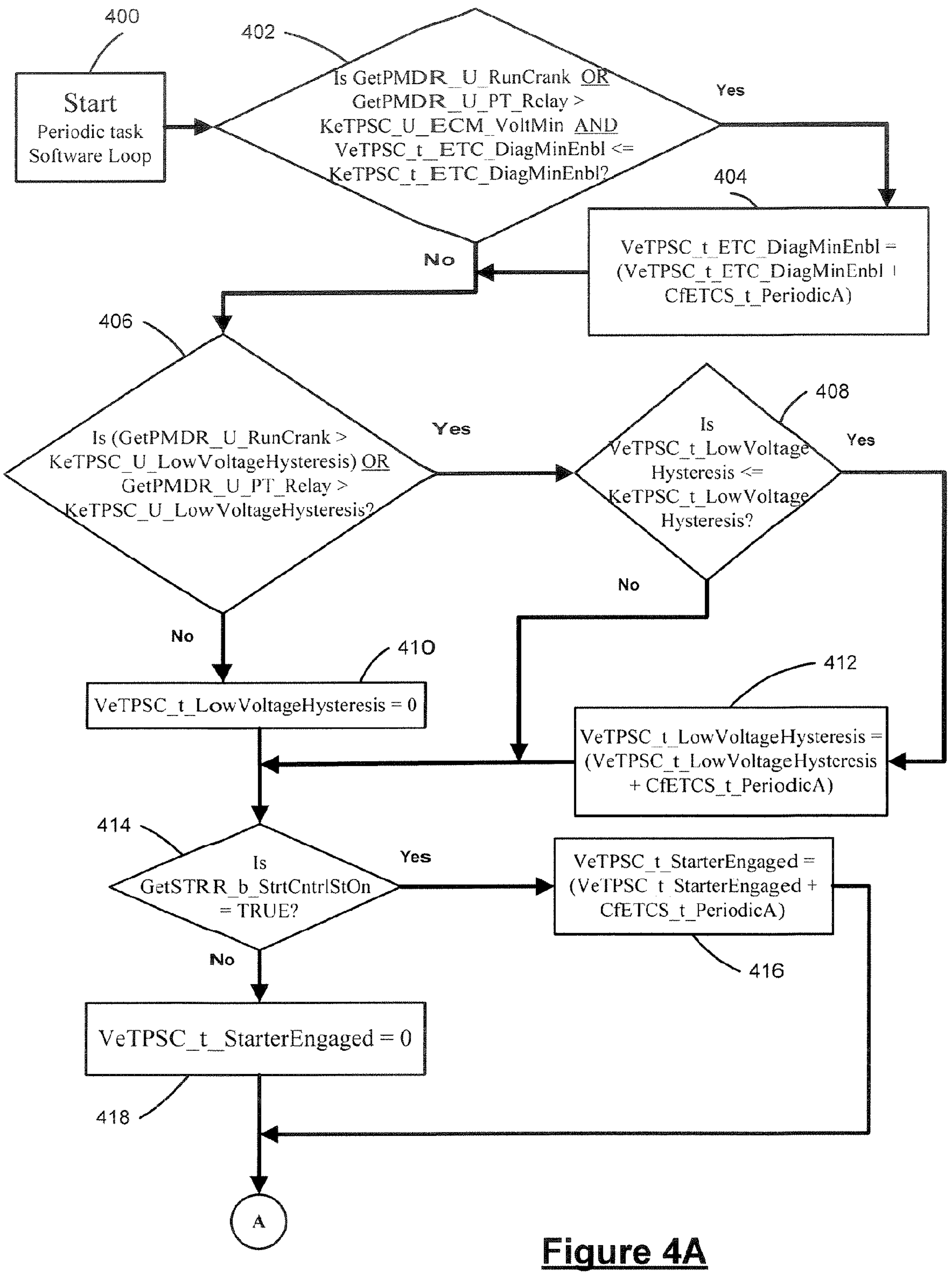
FIG. 4A-4C are flow charts illustrating the steps performed by the fault clearing algorithm of the present disclosure.

Referring now to FIG. 4A, detailed steps for clearing low-voltage faults are continued. In a preferred embodiment, the fault clearing algorithm is a software routine periodically executed by the ETC diagnostic module 26Control begins with step 400 when each periodic task loop is started. An exemplary period may be 12.5 ms. After starting the periodic task loop, control continues in step 402. In step 402, control determines whether vehicle 10 voltages are below calibration thresholds and if the main diagnostics run timer is less than or equal to its calibration thresholdMore particularly, whether GetPMDR_U_RunCrank, the voltage measured on the Run/Crank Ignition controller input, is GREATER THAN calibrated threshold KeTPSC_U_ECM_VoltMin, set to an exemplary value of 6.0V, which is the low voltage check to disable the fuel and starter and to clear the ETC diagnostics, OR if GetPMDR_U_PT_Relay, the undefaulted powertrain relay voltage, is GREATER THAN calibration threshold KeTPSC_U_ECM_VoltMin, also set to an exemplary value of 6.0V, which is the low voltage check to disable the fuel and starter and to clear the ETC diagnostics; AND if VeTPSC_t_ETC_DiagMinEnbl, the main diagnostics run timer, is LESS THAN OR EQUAL TO calibrated threshold KeTPSC_t_ETC_DiagMinEnbl, set to an exemplary value of 225 ms, which is the minimum time after ignition on to allow the main diagnostics to run before clearing ETC diagnostics. If step 402 is TRUE, then control continues in step 404, if false, control continues in step 406.

In step 404, control sets timer VeTPSC_t_ETC_DiagMinEnbl, equal to its current value plus a periodic value, CfETCS_t_PeriodicA, set to an exemplary value of 12.5 ms. After step 404 is completed control continues in step 406.

In step 406, control determines whether vehicle 10 voltages are above calibration thresholdsMore particularly, whether GetPMDR_U_PT_Relay, the undefaulted powertrain relay voltage, is GREATER THAN calibration threshold KeTPSC_U_LowVoltageHysteresis, set to an exemplary value of 8.5 V, which provides a voltage stability check used in the low voltage fault clearing logic; OR if GetPMDR_U_RunCrank, the voltage measured on the Run/Crank Ignition controller input, is GREATER THAN calibration threshold KeTPSC_U_LowVoltageHysteresis. If vehicle voltages are above threshold levels, then the correction algorithm continues in step 408, if not, control continues in step 410.

In step 408, control determines whether VeTPSC_t_LowVoltageHysteresis, the timer used for the minimum time needed for voltage to become stable above a threshold before the low voltage fault clearing request and fuel disable logic is cleared, is LESS THAN OR EQUAL TO the calibrated threshold, KeTPSC_U_LowVoltageHysteresis, set to an exemplary 500 ms, which provides a hysteresis loop for the voltage stability check used to clear low voltage induced faults. If VeTPSC_t_LowVoltageHysteresis is LESS THAN OR EQUAL TO KeTPSC_U_LowVoltageHysteresis, control continues in step 412, if not, control continues in step 414.

In step 410, control sets VeTPSC_t_LowVoltageHysteresis to 0.VeTPSC_t_LowVoltageHysteresis is the timer providing the hysteresis loop for voltage to become stable above a threshold before the low voltage fault clearing request and fuel disable logic is cleared. After step 410 is completed, control continues in step 414.

In step 412, control sets timer VeTPSC_t_ETC_DiagMinEnbl, the timer providing for a minimum time to allow the main diagnostics to run, equal to its current value plus the periodic value, CfETCS_t_PeriodicA, set to an exemplary 12.5 ms. After step 412 is completed control continues in step 414.

In step 414, control enters the Crank Transition state. In the Crank Transition state, if control determines that the starter motor 34 is being commanded on, fuel will be enabled and the low voltage induced processor related faults will be cleared-Control continues in step 414, by executing GetSTRR_b_StrtCntrlStOn, which returns an indication of the PCM controlled commanded state of the starter output driver. If GetSTRR_b_StrtCntrlStOn is TRUE, control continues in step 416, if FALSE control continues in step 418.

In step 416, control sets VeTPSC_t_StarterEngaged, the timer that starts when the starter is commanded on, equal to its current value plus the periodic value, CfETCS_t_PeriodicA, set to an exemplary 12.5 ms. After step 416 is completed control continues in step 420 (seen in FIG. 4B).

In step 418, VeTPSC_t_StarterEngaged, the starter motor 34, is set to 0. After step 418 is completed control continues in step 420 (seen in FIG. 4B).

Figure 4B:
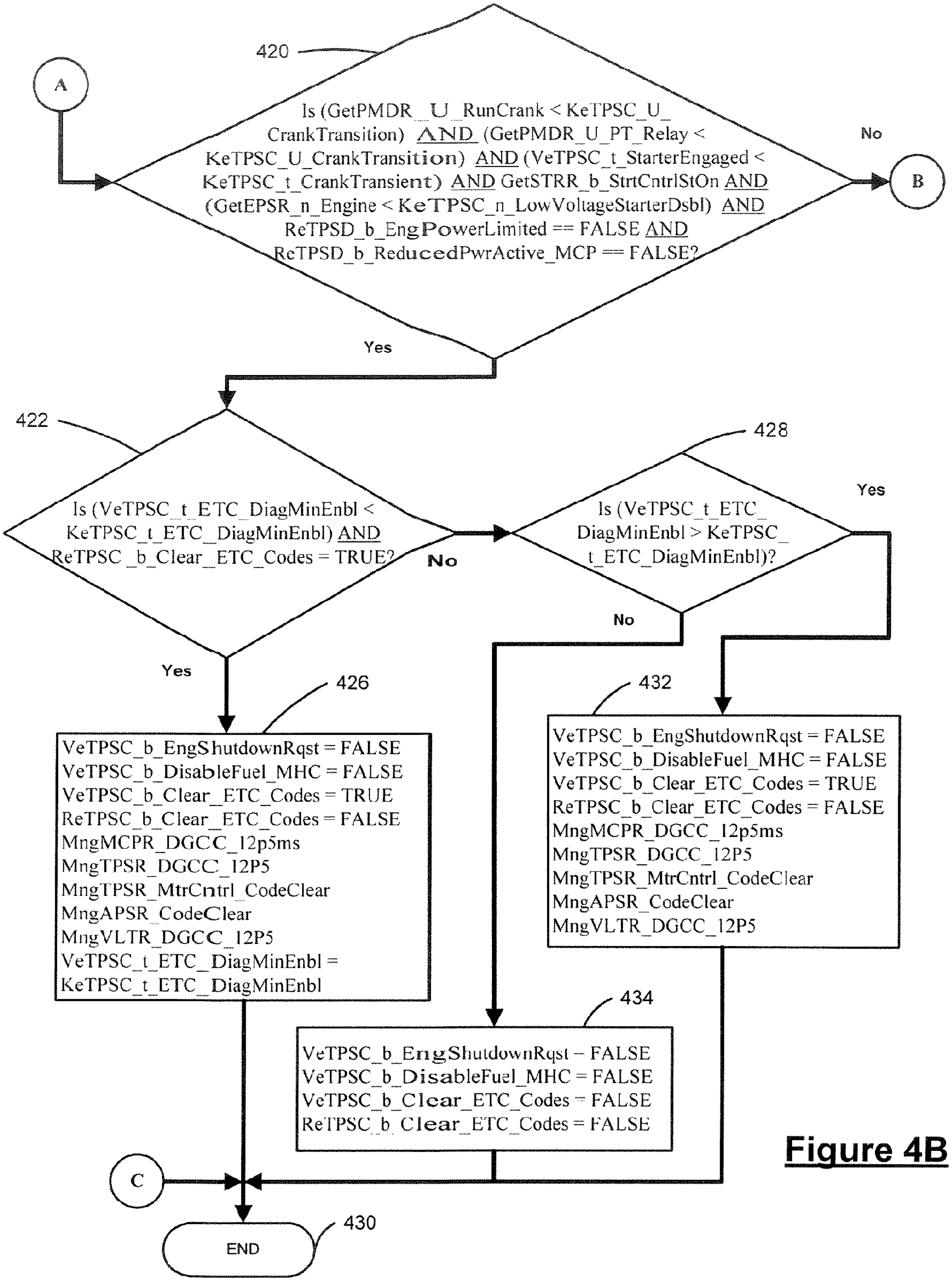

Referring now to FIG. 4B, detailed steps for a periodic task loop are continued. In step 420, control determines whether vehicle 10 low-voltage, engine starter ON conditions exist, as well as whether the engine 12 is in a limited-power mode-More specifically, control determines whether the Run/Crank voltage, GetPMDR_U_RunCrank, is LESS THAN its calibrated threshold, KeTPSC_U_CrankTransition, set to an exemplary 7.0 V; AND whether the powertrain voltage, GetPMDR_U_PT_Relay, is also LESS THAN KeTPSC_U_CrankTransition; AND whether starter motor 34 timer, VeTPSC_t_StarterEngaged, is LESS THAN its calibrated threshold, KeTPSC_t_CrankTransition, set to an exemplary 15 seconds, the calibrated time where crank transition caused low voltage conditions won't set ETC diagnostic faults; AND whether GetSTRR_b_StrtCntrlStOn is TRUE, indicating the starter motor 34 is ON; AND whether the RPM of the engine, GetEPSR_n_Engine, is LESS THAN its calibrated threshold, KeTPSC_n_LowVoltageStarterDsbl, set to an exemplary 800RPM, an RPM threshold used to disable the low voltage crank fault clearing logic; AND whether ReTPSD_b_EngPowerLimited, indicating whether engine power should be limited, is equal to FALSE; AND whether ReTPSD_b_ReducedPwrActive_MCP, indicating whether the engine is in a limited-power mode, is FALSE. If step 420 is true, then control continues in step 422. If step 420 is false, control continues in step 424.

In step 422, control determines whether the minimum timer for diagnostics to run, VeTPSC_t_ETC_DiagMinEnbl, is LESS THAN calibration threshold, KeTPSC_t_ETC_DiagMinEnbl (set to an exemplary 225 ms), the minimum time after ignition on to allow main diagnostics to run before clearing; AND whether ReTPSC_b_Clear_ETC_Codes, indicating whether the low voltage fault clearing and fuel disable logic is active, is TRUE. If step 422 is TRUE, control continues in step 426. If step 422 is false, control continues in step 428.

In step 426, control sets module diagnostics, including the ETC diagnostics to the Crank Transition state, by setting the following: VeTPSC_b_EngShutdownRqst, the low voltage fuel disable signal, is set to FALSE; VeTPSC_b_DisableFuel_MHC, the redundant fuel disable signal, is set to FALSE; VeTPSC_b_Clear_ETC_Codes, the signal enabling the clearing of all the ETC diagnostics and fail counters, is set to TRUE; and ReTPSC_b_Clear_ETC_Codes, the signal indicating that the low voltage fault clearing and fuel disable logic is active, is set to FALSEContinuing in step 426, control executes the following functions: MngAPSR_CodeClear, which clears pedal sensor related faults; MngMCPR_DGCC__12p5 ms, which clears processor communication faults; MngTPSR_DGCC__12P5, which clears throttle body related faults; MngTPSR_MtrCntrl_CodeClear, which clears throttle sensor related faults; and MngVLTR_DGCC__12P5, which clears reference voltage (5 Volt) related faultsLastly, VeTPSC_t_ETC_DiagMinEnbl is set equal to KeTPSC_t_ETC_DiagMinEnbl. After step 426 is completed control continues in step 430, and ends.

In step 428, control determines whether the main diagnostics timer, VeTPSC_t_ETC_DiagMinEnbl, is LESS THAN its calibrated threshold, KeTPSC_t_ETC_DiagMinEnbl, set to an exemplary 225 ms. If VeTPSC_t_ETC_DiagMinEnbl is GREATER THAN KeTPSC_t_ETC_DiagMinEnbl, indicating that enough time has passed since ignition ON to allow sufficient time for main diagnostics to run, then control continues in step 432, if not control continues in step 434.

In step 432, control sets module diagnostics, including the ETC diagnostics, to the Crank Transition state, by setting the following: VeTPSC_b_EngShutdownRqst is set to FALSE; VeTPSC_b_DisableFuel_MHC is set to FALSE; VeTPSC_b_Clear_ETC_Codes is set to TRUE; and ReTPSC_b_Clear_ETC_Codes is set to FALSEContinuing in step 432, control executes the following functions: MngAPSR_CodeClear, MngMCPR_DGCC__12p5 ms, MngTPSR_DGCC__12P5, MngTPSR_MtrCntrl_CodeClear, and MngVLTR_DGCC__12P5. After step 432 is completed control continues in step 430, and ends.

In step 434, control sets the ETC diagnostics to normal by setting the following: VeTPSC_b_EngShutdownRqst is set to FALSE; VeTPSC_b_DisableFuel_MHC is set to FALSE; VeTPSC_b_Clear_ETC_Codes is set to FALSE; and ReTPSC_b_Clear_ETC_Codes is set to FALSE. After step 434 is completed control continues in step 430, and ends.

Figure 4C:
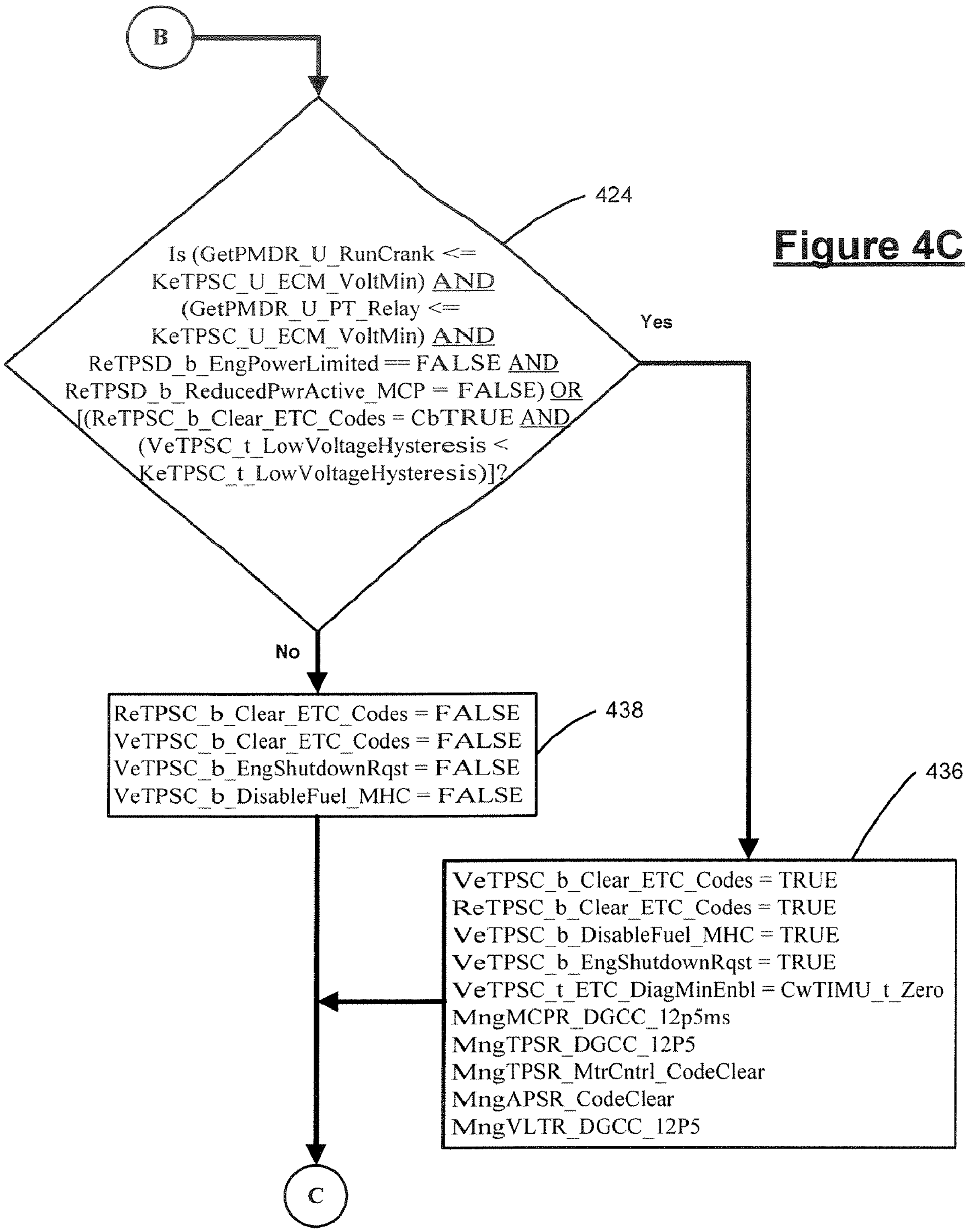

Referring to FIG. 4C, detailed steps for a periodic task loop are continued where the low voltage, non-cranking and low voltage recovery states are discussed in detailControl determines whether the vehicle is in the Low-voltage, Non-cranking state or the Low-voltage Recovery state in step 424. In step 424 control determines whether the Run/Crank Ignition Controller input voltage, GetPMDR_U_RunCrank, is LESS THAN its calibrated threshold, KeTPSC_U_ECM_VoltMin, set to an exemplary 5.5 V, the low voltage check to disable the fuel and starter and to clear the ETC diagnostics; AND whether the powertrain voltage, GetPMDR_U_PT_Relay, is also LESS THAN KeTPSC_U_ECM_VoltMin; AND whether ReTPSD_b_EngPowerLimited, indicating whether engine power should be limited, is FALSE; AND whether ReTPSD_b_ReducedPwrActive_MCP, indicating whether the MCP has entered the limited-power mode, is FALSE; AND whether ReTPSC_b_Clear_ETC_Codes, indicating whether the low voltage fault clearing and fuel disable logic is active, is TRUE; AND whether the voltage hysteresis timer, VeTPSC_t_LowVoltageHysteresis, that measures the minimum time needed for voltage to become stable before the low voltage fault clearing request and fuel disable logic is cleared, is less than its calibrated threshold, KeTPSC_t_LowVoltageHysteresis, set to an exemplary 100 ms. If step 424 is true, then control sets the low voltage, non-cranking state in step 436. If step 424 is false, then control sets the low-voltage recovery state and returns engine diagnostics, including ETC Diagnostics, for the ETC 18 and ETC diagnostic module 26 to normal in step 438.

In step 436, control enters the low voltage, non-cranking state by setting the following: VeTPSC_b_EngShutdownRqst is set to TRUE; VeTPSC_b_DisableFuel_MHC is set to TRUE; VeTPSC_b_Clear_ETC_Codes is set to TRUE; and ReTPSC_b_Clear_ETC_Codes is set to TRUEContinuing in step 436, the fault clearing algorithm runs the following functions: MngAPSR_CodeClear, MngMCPR_DGCC__12p5ms, MngTPSR_DGCC__12P5, MngTPSR_MtrCntrl_CodeClear, and MngVLTR_DGCC__12P5. Thus the fuel is disabled and all Diagnostic codes relating to the low-voltage condition are reset. After step 436 is completed, control continues to step 430 (see in FIG. 4B), and ends.

In step 438, control enters the low voltage recovery state by setting the following: VeTPSC_b_EngShutdownRqst is set to FALSE, VeTPSC_b_DisableFuel_MHC is set to FALSE, VeTPSC_b_Clear_ETC_Codes is set to FALSE, and ReTPSC_b_Clear_ETC_Codes is set to FALSE. Thus the fuel is enabled and all module diagnostics are returned to normal. After step 438 is completed, control continues to step 430 (see in FIG. 4B), and ends.

What is claimed is:

1. A fault clearing system for an engine control system, comprising:

a plurality of processor modules operable to control and monitor an engine including an electronic throttle control (ETC) module operable to control and monitor a throttle of said engine, said processor modules setting faults based on outputs from a plurality of engine sensors and ETC sensors; and an ETC diagnostic module that monitors said ETC sensors and said engine sensors, said ETC diagnostic module setting a low voltage induced fault, and entering one of a plurality of low voltage states in response to said low voltage induced fault, wherein said ETC diagnostic module controls said ETC module to selectively clear said faults in said ETC module and said plurality of processor modules upon entry into said one of said low voltage states, wherein said plurality of low voltage states of said ETC diagnostic module includes (i) a low power state selected by said ETC diagnostic module when a limited-power mode has already been selected by said ETC module, wherein said low power state disables said fault clearing system and said ETC module and said engine remain in said limited-power mode, and (ii) a crank transition state selected by said ETC diagnostic module when: monitored voltages received from said engine sensors and said ETC sensors are above a first calibration voltage for more than a first calibration time, so long as the ETC diagnostic module is not already in a low voltage non-cranking state; said monitored voltages received from said engine sensors and said ETC sensors are below a second calibration voltage; monitored engine RPM is below a calibration RPM; and an engine starter is currently cranking and has been cranking for less than a second calibration time.

2. The fault clearing system of claim 1 wherein said first calibration voltage is 6.0 V, said first calibration time is 225 milliseconds, said second calibration voltage is 7.0 V, said calibration RPM is 800 RPM, and said second calibration time is 15 seconds.

3. The fault clearing system of claim 1 wherein a first timer is started when said ETC diagnostic module receives voltages from said engine sensors and said ETC sensors that are greater than said first calibration voltage, wherein said ETC diagnostic module enters said crank transition state when said first timer is greater than said first calibration time.

4. The fault clearing system of claim 1 wherein a second timer is started when said engine starter begins cranking, wherein said ETC diagnostic module remains in said crank transition state until said second timer is greater than said second calibration time.

5. The fault clearing system of claim 1 wherein said crank transition state generates ETC diagnostic signals clearing low voltage faults for said ETC module and said plurality of processor modules, and enables fuel to said engine.

6. A fault clearing system for an engine control system, comprising:

a plurality of processor modules operable to control and monitor an engine including an electronic throttle control (ETC) module operable to control and monitor a throttle of said engine, said processor modules setting faults based on outputs from a plurality of engine sensors and ETC sensors; and an ETC diagnostic module that monitors said ETC sensors and said engine sensors, said ETC diagnostic module setting a low voltage induced fault, and entering one of a plurality of low voltage states in response to said low voltage induced fault, wherein said ETC diagnostic module controls said ETC module to selectively clear said faults in said ETC module and said plurality of processor modules upon entry into said one of said low voltage states, wherein said plurality of low voltage states of said ETC diagnostic module includes a low voltage recovery state selected by said ETC diagnostic module when measured voltages received from said engine sensors and said ETC sensors are greater than a first calibration voltage for greater than a first calibration time, and wherein said low voltage recovery state generates ETC diagnostic signals clearing low voltage faults for said ETC module and said plurality of processor modules and disables fuel to said engine, until a first timer is greater than said first calibration time, thereafter, said low voltage recovery state ends and said ETC diagnostic module returns to normal operation where none of said plurality of low voltage states are selected.

7. A method of clearing low voltage faults of an engine control system, comprising:

monitoring vehicle voltages and faults;

setting one of a plurality of low voltage states in response to a low voltage induced fault, wherein said low voltage states selectively control an electronic throttle control (ETC); and selectively clearing said faults in said engine control system upon entry into said one of said low voltage states, wherein said plurality of low voltage states includes (i) a low power state selected when said ETC is already in a limited-power mode, wherein said low power state disables said low voltage fault clearing method and said ETC and said engine remain in said limited-power mode, and (ii) a crank transition state, wherein said crank transition state is selected when: said monitored voltages are above a first calibration voltage for more than a first calibration time as long as a low voltage non-cranking state does not already exist; said monitored voltages are below a second calibration voltage; monitored engine RPM is below a calibration RPM; and an engine starter is currently cranking and has been cranking for less than a second calibration time.

8. The method of claim 7 wherein said first calibration voltage is 6.0 V, said first calibration time is 225 milliseconds, said second calibration voltage is 7.0 V, said calibration RPM is 800 RPM, and said second calibration time is 15 milliseconds.

9. The method of claim 7 wherein said crank transition state clears low voltage induced faults for said ETC and said engine and enables fuel to said engine.

10. A method of clearing low voltage faults of an engine control system, comprising:

monitoring vehicle voltages and faults;

setting one of a plurality of low voltage states in response to a low voltage induced fault, wherein said low voltage states selectively control an electronic throttle control (ETC), and wherein said plurality of low voltage states includes a low voltage recovery state that is selected when said monitored voltages are greater than a first calibration voltage for greater than a first calibration time; and selectively clearing said faults in said engine control system upon entry into said one of said low voltage states, wherein said low voltage recovery state clears low voltage induced faults for said ETC and said engine, and disables fuel to said engine, until said monitored voltages are greater than said first calibration voltage for more than said first calibration time, thereafter, said low voltage recovery state ends and said low voltage fault clearing method returns to normal operation where none of said plurality of low voltage states are selected.

* * * * *